(12) United States Patent
Brewton et al.

(10) Patent No.: US 7,966,562 B1
(45) Date of Patent: Jun. 21, 2011

(54) SYSTEM AND METHOD FOR PROVIDING DOMAIN-SENSITIVE HELP

(75) Inventors: Nathan E. Brewton, Wayland, MA (US); Dallas C. Kennedy, Natick, MA (US); Paul F. Kinnucan, Jr., Milton, MA (US)

(73) Assignee: The MathWorks, Inc., Natick, MA (US)

( * ) Notice: Subject to any disclaimer, the term of this patent is extended or adjusted under 35 U.S.C. 154(b) by 592 days.

(21) Appl. No.: 11/319,828

(22) Filed: Dec. 28, 2005

(51) Int. Cl.
*G06F 3/00* (2006.01)
(52) U.S. Cl. ........ 715/705; 715/276; 715/708; 715/714; 709/219; 709/245
(58) Field of Classification Search .................. 715/705, 715/714, 763, 276, 708
See application file for complete search history.

(56) References Cited

U.S. PATENT DOCUMENTS

| | | | | |
|---|---|---|---|---|
| 4,648,062 A | * | 3/1987 | Johnson et al. | 715/708 |
| 5,388,251 A | * | 2/1995 | Makino et al. | 714/57 |
| 5,877,757 A | * | 3/1999 | Baldwin et al. | 715/705 |
| 6,339,436 B1 | * | 1/2002 | Amro et al. | 715/714 |
| 6,990,532 B2 | * | 1/2006 | Day et al. | 709/245 |
| 7,496,895 B1 | * | 2/2009 | Mosterman et al. | 717/124 |
| 2003/0086421 A1 | * | 5/2003 | Awsienko et al. | 370/387 |
| 2004/0044635 A1 | * | 3/2004 | Gordon et al. | 706/50 |
| 2005/0149496 A1 | * | 7/2005 | Mukherjee et al. | 707/3 |
| 2007/0113180 A1 | * | 5/2007 | Danninger | 715/705 |
| 2007/0136667 A1 | * | 6/2007 | Gerhart et al. | 715/705 |
| 2008/0163052 A1 | * | 7/2008 | George et al. | 715/702 |

OTHER PUBLICATIONS

Help for the Designers of Online Help Systems;ACM SIGCHI Bulletin archive vol. 20 , Issue 1 (Jul. 1988) Year of Publication pp. 66-69 Authors Brad Mehlenbacher; Tom Duffy; Jim Palmer; Maria Truschel; Karen Denchfield; Ann Aaron.*

* cited by examiner

*Primary Examiner* — William L Bashore
*Assistant Examiner* — Meseker Takele
(74) *Attorney, Agent, or Firm* — Nelson Mullins Riley & Scarborough LLP; Kevin J. Canning; John S. Curran

(57) ABSTRACT

A help facility for a graphical modeling environment that determines the domain of a multi-domain graphical object and provides the correct documentation for that object in that domain is discussed. The help facility determines the identity of the multi-domain graphical object and the domain in which the multi-domain graphical object is instantiated. Once the domain and the graphical object identity are determined, the help facility triggers a help callback restricted to that domain that provides domain appropriate help for the object.

30 Claims, 13 Drawing Sheets

SYSTEM AND METHOD FOR PROVIDING DOMAIN-SENSITIVE HELP

FIELD OF THE INVENTION

The illustrative embodiment of the present invention relates generally to processing help requests for a graphical model, and more particularly to providing domain-sensitive help associated with multi-domain graphical objects.

BACKGROUND

Online help is important to users of computer-based software such as graphical modeling software. Conventionally, a user-initiated event triggers execution of a software method (a "help callback") that provides documentation, in displayed or other form, for a graphical object in an application. The properties of the graphical object (appearance, methods, and functionality) depend in general on the domain. The corresponding documentation can vary by domain as well. The domain of a graphical object may be defined by the state of the graphical object, the connections of the graphical object (both the specific graphical objects to which it is connected and the semantics and syntax of the graphical language used) and the state of the native or instantiated digital file containing the graphical object.

In a single-domain environment, all instances of a class of objects have the same appearance and behavior. Consequently, in a single-domain environment, the help system provides the same help for all instances of a class of objects. It typically does this by invoking a callback method that provides the information when the user requests help for an instance of the class.

In a multi-domain environment, the appearance and behavior of instances of a class of objects may vary, depending on the domain in which the objects appear. As a result, the help facility in a multi-domain environment must be able to provide different help for instances of a class of objects, depending on the domain in which the instances occur. It would be desirable for a help system in such a multi-domain environment to be able to determine the domain as well as the type of a graphical object in order to provide domain-sensitive help.

BRIEF SUMMARY

The illustrative embodiment of the present invention provides a help facility for a graphical modeling environment that determines the domain of a multi-domain graphical object and provides the correct documentation for that object in that domain. The help facility determines the identity of the type of multi-domain graphical object and the domain in which the multi-domain graphical object is instantiated. Once the domain and the graphical object identity are determined, the help facility triggers a help callback restricted to that domain.

In one aspect of the present invention in a multi-domain graphical modeling environment, a method of invoking domain-specific help callbacks for multi-domain graphical objects includes the step of receiving a help request from an instance of a multi-domain graphical object. The method also identifies the type of multi-domain graphical object associated with the help callback and identifies dynamically a current domain of the instance of the multi-domain graphical object. Following the identifications, the method invokes a domain-specific help callback registered with the help facility for the type and domain identified for the multi-domain graphical object.

In an aspect of the present invention in a multi-domain graphical modeling environment, a method of invoking domain-specific help callbacks for multi-domain graphical objects includes the step of receiving with the multi-domain modeling environment at least one registration from a domain application for a callback method associated with a multi-domain graphical object. The method also includes the step of receiving a user help request that is associated with an instance of the multi-domain graphical object. The instance of the multi-domain graphical object is part of the same modeling domain as the domain application. The method further identifies a current domain of the instance of the multi-domain graphical object based on the registration of the callback method. Also, the method invokes the registered callback method and displays domain-dependent help to the user as a result of the execution of the registered callback method.

In one aspect of the present invention in a multi-domain graphical modeling environment, a method of invoking domain-specific help callbacks for multi-domain graphical objects includes the step of registering a domain-specific callback method for a multi-domain object by adding a domain-specific help method for a class of the multi-domain object to a list of methods stored as a help callback property of the class. The registering occurs at a time of the initial loading of the domain application into memory. The method also includes the step of receiving a user help request associated with an instance of the multi-domain graphical object. The instance of the multi-domain graphical object is part of the same modeling domain as the domain application. The method further identifies the class and domain of the multi-domain graphical object and retrieves the domain-specific help method using the identified class and domain. Additionally, the method invokes the domain-specific help method displaying domain-specific help to the user as a result of the execution of the registered callback method.

In another aspect of the present invention in a multi-domain graphical modeling environment, a system for invoking domain-specific help callbacks for multi-domain graphical objects includes multiple modeling domains that each contain definitions for multiple graphical objects. The system also includes a graphical model that contains at least one instance of a graphical object that is defined in more than one of the multiple modeling domains. Additionally, the system also includes a help facility for receiving a help request from an instance of a multi-domain graphical object. The help facility also identifies dynamically the instance of the multi-domain graphical object associated with the help callback and identifies a current domain of the instance of the multi-domain graphical object.

In an aspect of the present invention in a multi-domain graphical modeling environment a method of providing domain-specific help for multi-domain graphical objects includes the step of receiving a help request from a user for an instance of a multi-domain graphical object. The method further includes the steps of identifying in response to the received help request the type of the multi-domain graphical object associated with the help request and identifying dynamically a current domain of the instance of the multi-domain graphical object. Additionally, the method provides domain-specific help to the user with the help facility for the type and domain identified for the multi-domain graphical object.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Graphical modeling environments support models with components represented by instances of graphical objects. Some of the instances of graphical objects in the model are instances of multi-domain objects in that they may occur in a number of different modeling domains supported by the modeling environment. A domain may be any scientific, engineering, business, artistic, entertainment or other endeavor that sets standards for defining graphical objects. The graphical objects are frequently stored in libraries from which the instances of the graphical objects are instantiated in a model. The different graphical objects provide different functionality and properties for the portions of the systems being modeled. A multi-domain graphical object can occur in more than one domain and may have different functionality, semantics and properties in each domain. In order to provide help appropriate for a graphical object instance which is associated with a help callback request, the illustrative embodiment of the present invention identifies the graphical object instance and provides domain appropriate help data.

In one implementation of the present invention, when a domain application is first loaded into memory, it registers domain-specific help callbacks for each class of multi-domain objects that can occur in its domain. The domain does this by adding its domain-specific help method for a class of objects to a list of methods stored as a help callback property of the class itself. Later, when the user requests help for an object, the help system determines the class and domain of the object and uses this information to retrieve the domain-specific method from the class. The help system then invokes the callback method to provide domain-specific help for the object.

In another implementation of the present invention, an application for a modeling domain registers a domain-specific help callback method for an object at the time of the object's creation or when the object is moved from one domain to another. The application performs this registration by storing a pointer to the domain-specific method as the value of the object's help callback property. Later, when a user requests help for the object, the help system retrieves the pointer from the object and uses the pointer to invoke the domain-specific help method.

Figure 1:
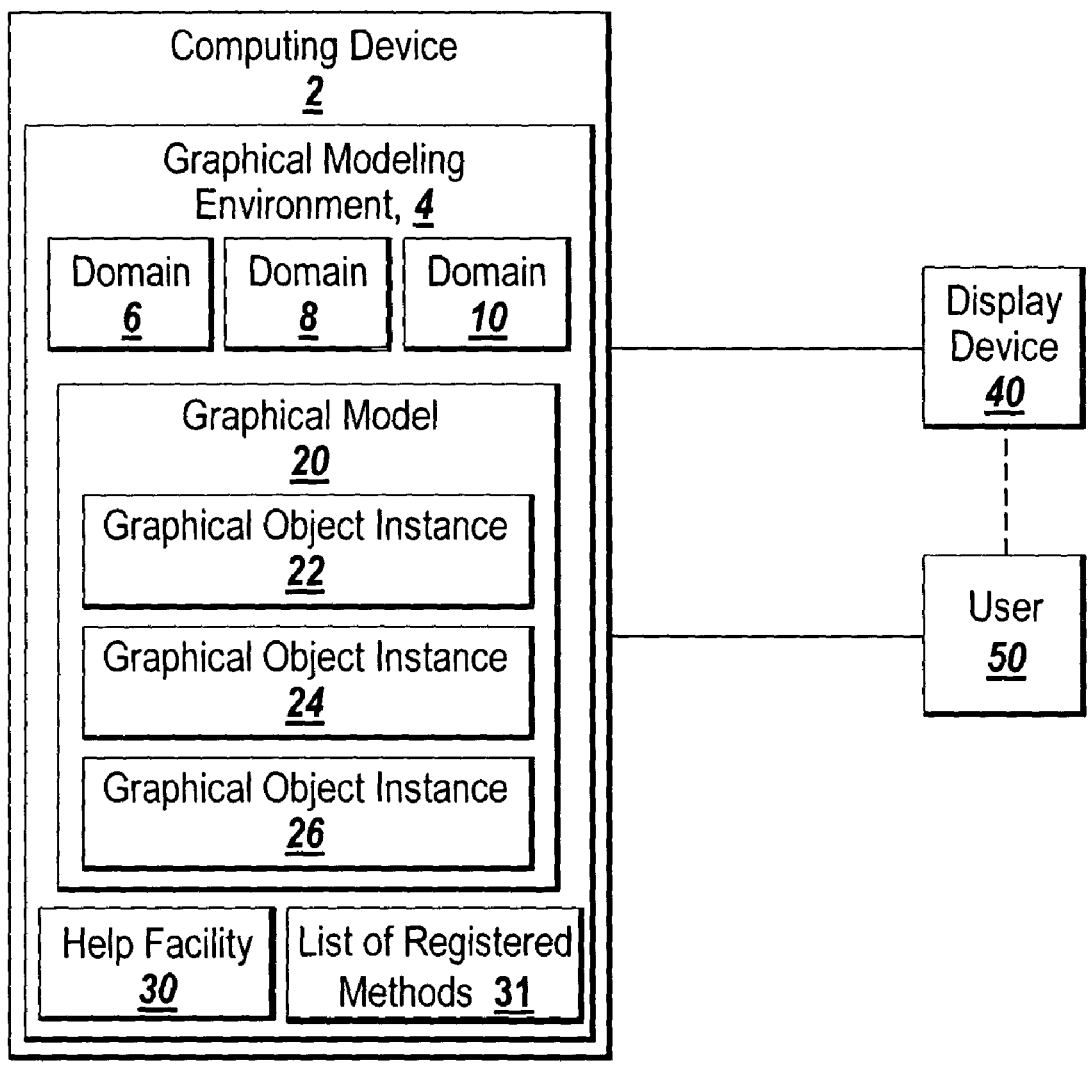
FIG. 1 depicts an environment suitable for practicing the illustrative embodiment of the present invention.

FIG. 1 depicts an environment suitable for practicing the illustrative embodiment of the present invention. A computing device 2 supports a graphical modeling environment 4. The computing device 2 may be a PC, workstation, server, laptop, mainframe, PDA or other computing device equipped with a processor and capable of hosting the graphical modeling environment 4. The computing device 2 may be equipped with a single processor, a multi-core processor, or multiple processors. The processor may be a 32 bit processor, 64 bit processor or some other type of processor capable of executing the instructions required for the present invention. The graphical modeling environment 4 includes multiple modeling domains 6, 8 and 10. The modeling domains 6, 8 and 10 may be grouped libraries of graphical objects associated with a particular plug-in application for the graphical modeling environment.

The graphical modeling environment 4 may be a block diagram modeling and simulation environment, such as SIMULINK from The MathWorks, Inc. of Natick, Mass. or LABVIEW from National Instruments, Inc. of Austin, Tex., a statechart and/or control flow diagramming environment, such as STATEFLOW from The MathWorks, Inc., STATEMATE, from iLogic, Inc. of Toronto, Canada and DYMOLA from Dynasim AB of Lund, Sweden, a mixed-block diagram/statechart modeling and simulation environment such as SIMPLORER from Anson Corporation of Pittsburgh, Pa., a data flow diagram environment, a UML modeling environment, a discrete event simulation environment such as ANYLOGIC from XJ Technologies of St. Petersburg, Russia or EXTEND from Imagine That, Inc. of San Jose, Calif. or some other type of graphical modeling environment. The graphical modeling environment 4 supports the creation and execution of a graphical model 20. The graphical model 20 may be a UML diagram, block diagram model, a statechart, a graphical representation of a finite state machine, a control flow diagram, a data flow diagram, an entity flow network diagram, or other type of graphical model.

The graphical model 20 includes multiple instances of graphical objects 22, 24 and 26 which may be instantiated from graphical objects defined in the domains 6, 8 and 10. At least one of the instances of graphical objects 22, 24 and 26 may be an instance of a multi-domain graphical object. The multi-domain graphical object may include a help callback method property that contains a pointer to a domain-specific help callback method. The domain application initializes this property to the appropriate method when it creates the object. The help facility may have access to a list of registered callback methods for different domains. The help facility 30 may be implemented in software or hardware. It will be appreciated that the help facility may be implemented as a separate application, a plug-in for the graphical modeling environment or as a section of code integrated into the graphical modeling environment. The help facility 30 may be utilized to invoke a callback method stored as a property of the graphical object instance 26 or to dynamically determine the class and domain of the graphical object instance in order to be able to select the appropriate domain-specific help callback method from the list of registered callbacks. The help may be presented to the user via a display device 40 that is in communication with the computing device 2. The operation of the help facility 30 is described in greater detail below.

Figure 2:
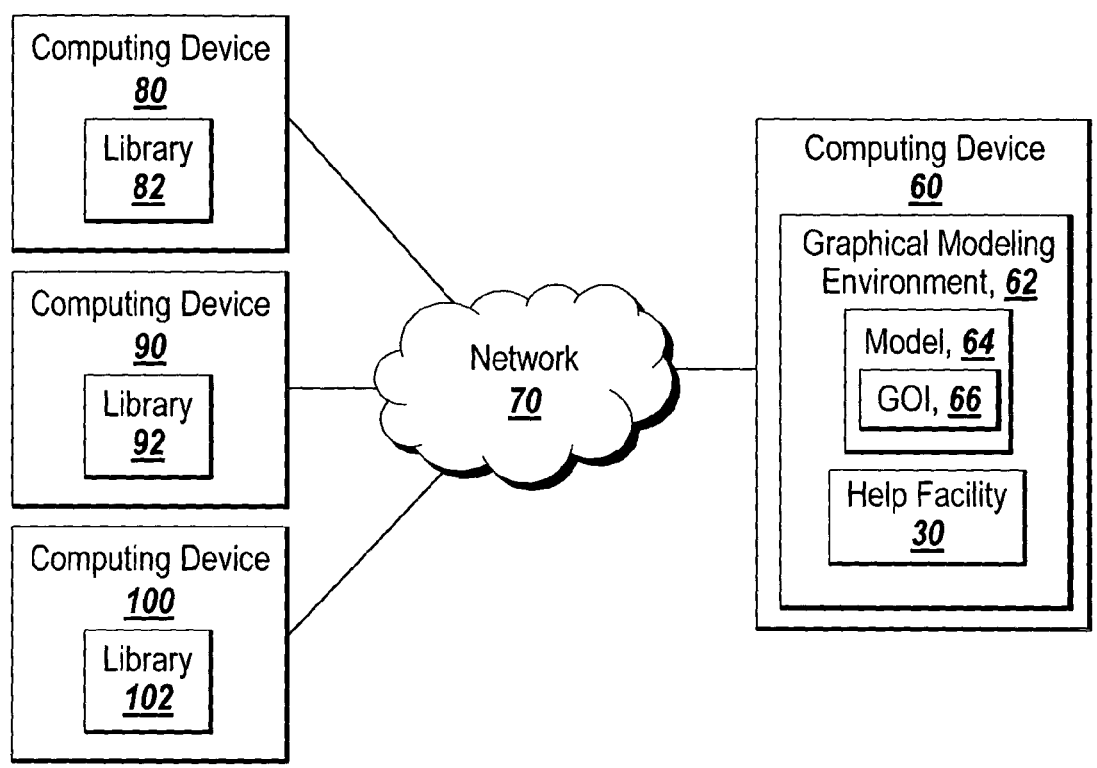
FIG. 2 depicts an alternate distributed environment suitable for practicing the illustrative embodiment of the present invention.

The illustrative embodiment of the present invention may also be practiced in a distributed environment as depicted in FIG. 2. A computing device 60 supports a graphical modeling environment 62. The graphical modeling environment 62 includes a graphical model 64 with at least one instance of a multi-domain graphical object 66. The graphical modeling environment 62 also includes a help facility 68. The computing device 60 communicates over a network 70 with computing devices 80, 90 and 100. The network 70 may be the Internet, a local area network (LAN), a wide area network (WAN), a wireless network, an intranet, an extranet or some other type of network. The computing devices 80, 90 and 100 may each store a library of graphical components 82, 92 and 102 respectively that are accessible from the graphical modeling environment 62. The graphical object instance 66 (GOI) may be instantiated from a graphical object contained in one of the libraries 82, 92 and 102. Those skilled in the art will recognize that other architectures are also possible within the scope of the present invention such as client-server and thin-client architectures. It will be appreciated by those skilled in the art that the various components discussed herein may operate in virtualized environments rather than on separate physical devices.

Figure 3:
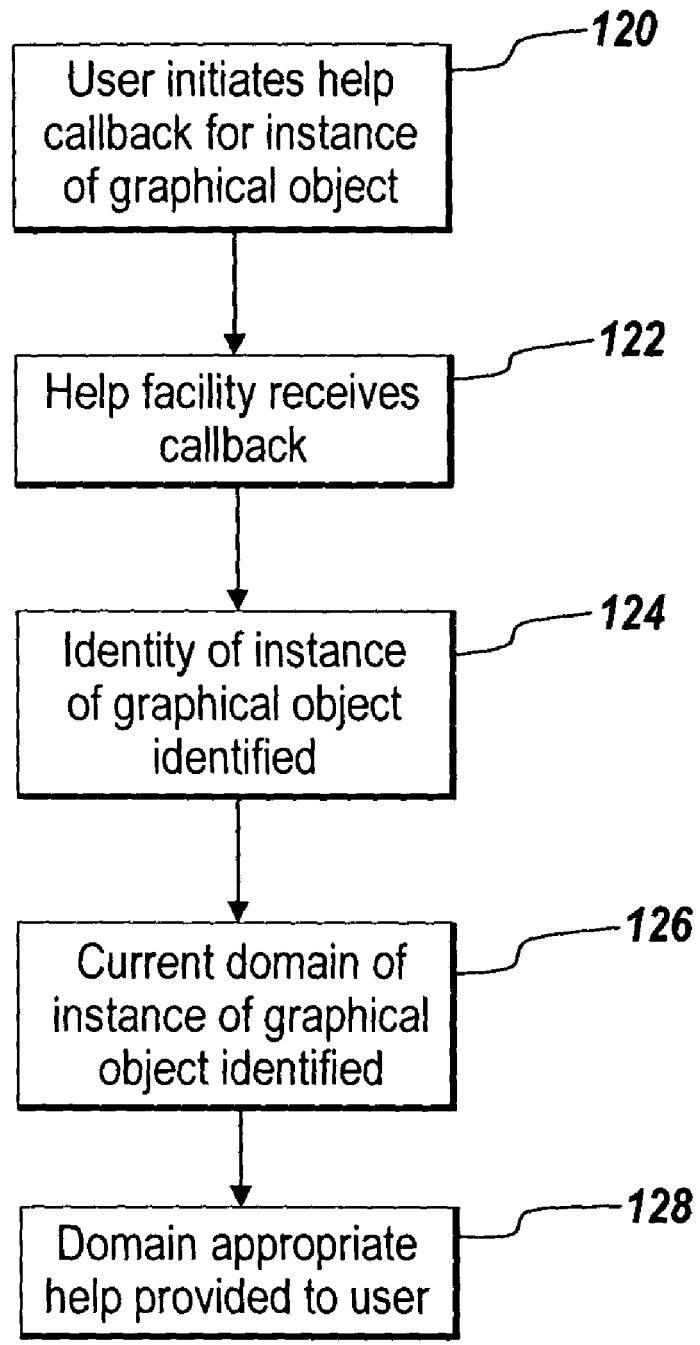
FIG. 3 is a flowchart of a sequence of steps followed by the illustrative embodiment of the present invention to dynamically provide domain-sensitive help.

As noted above, in one implementation the help facility 30 may be utilized to dynamically determine the class and domain of the graphical object instance in order to provide domain appropriate help data to a user 50. FIG. 3 depicts the sequence of steps followed by the illustrative embodiment of the present invention to dynamically determine the class and domain of the graphical object instance in order to provide domain specific help for an instance of a multi-domain graphical object. The sequence begins with the initiation of a help request by a user for an instance of a multi-domain graphical object (step 120). For example, the user might select a Help item from the object's context menu. The help facility 30 detects the help request (step 122). The help system then determines the class of the instance of the multi-domain graphical object (step 124) and the current domain for the instance of the graphical object is then also identified (step 126). Once both the identity of the instance of the graphical object and its current domain have been identified, the help facility invokes a callback function previously registered for that class and domain. The callback function then provides domain-specific help to the user (step 128).

The illustrative embodiment of the present invention differs from conventional mechanisms for providing context-sensitive help and conditionally installed documentation. In a context-sensitive help (CSH) system, the help system uses the context of a help request to determine the object for which help is requested. For example, the CSH system might use the position of the mouse cursor to determine that the user wants help for a particular edit field on a dialog box. The help system then invokes a callback that displays help appropriate for that object. In a context-sensitive help system, the objects always appear in the same context, predetermined when the system is built, and have the same graphical appearance and behavior. As a result, a CSH system always delivers the same help for any given object.

By contrast, in a domain-sensitive help (DSH) system, the context and appearance of objects is not predetermined when the system is built. Instead, user actions, e.g., when building a model, determine the context of objects. Further, the appearance, behavior, and semantics of an object, and hence the appropriate help for that object, can depend on the object's context in the case of multi-domain objects. As a result, in a DSH system, the help system can deliver different help for instances of the same class of object, depending on the domain of the object as determined by its context.

Figure 4:
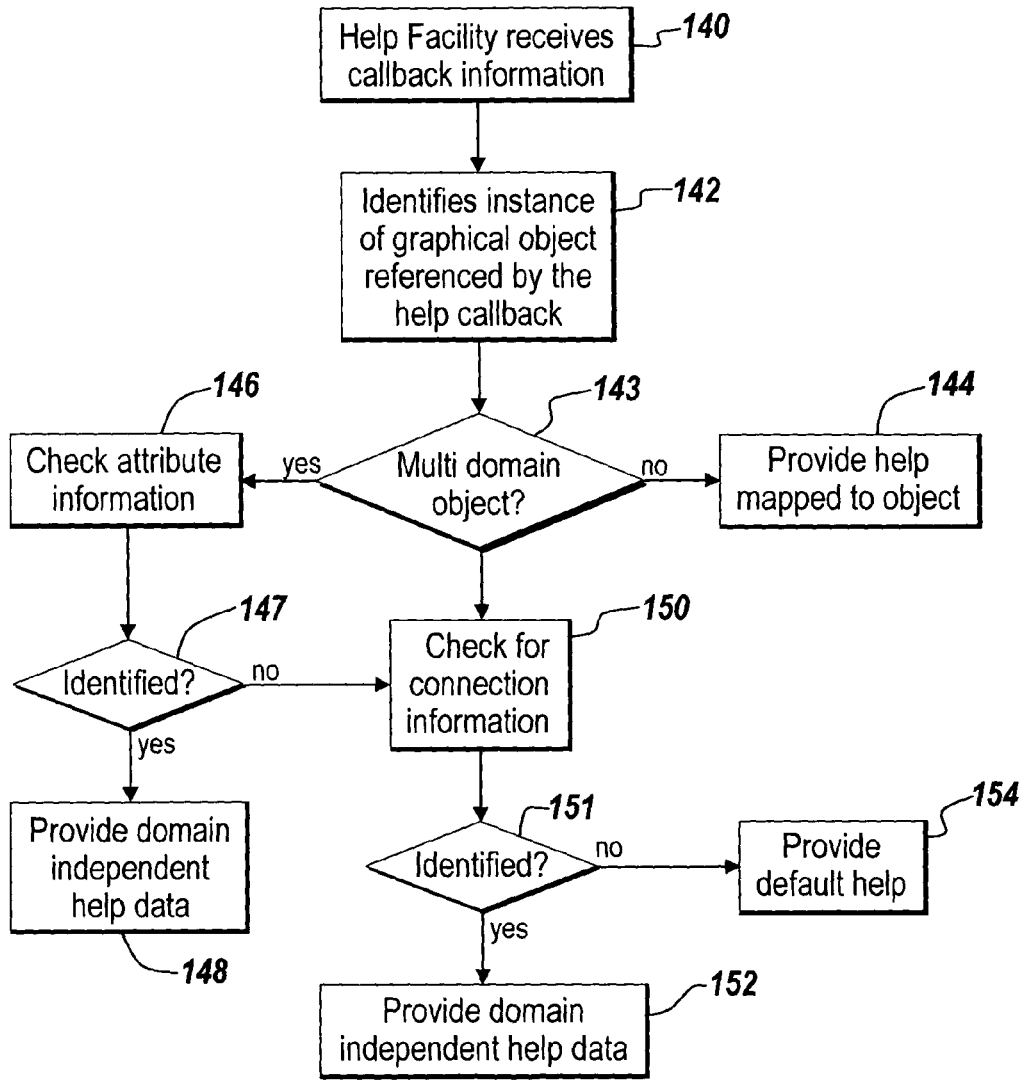
FIG. 4 is a flowchart of a sequence of steps followed by the illustrative embodiment to process help callback requests using model component connection information.

Each instance of a graphical object in a graphical model is instantiated from a class (graphical object definition) contained in one of the domains. The help facility 30 uses the information in the object classes to help identify the domain to which the calling instance belongs. FIG. 4 depicts the domain identification process in more detail. The sequence begins when the help facility 30 receives the user initiated help request associated with an instance of a graphical object (step 140). The help request may be initiated by the user by means of a mouse or other pointing device selecting a displayed GUI associated with the graphical object instance. Alternatively, the help request may be entered at a command line interface. The help facility identifies the instance of the graphical object referenced by the help request (step 142) and determines whether the object instantiated is of a multi-domain type (step 143). The determination as to whether the instance of the graphical object is a type of multi-domain object may be determined by comparing the object's class name to a list of multi-domain classes known to the system. If the object is not a multi-domain object, the help facility 30 provides help specific to that type of object (step 144), i.e., regardless of its context or domain.

Alternatively, if the help facility 30 determines that the graphical object instantiated and associated with the help request is a multi-domain object (step 143), the help facility checks attribute information associated with the instance of the graphical object (step 146). The attribute information may control the appearance of the instance of the graphical object in a displayed model or may be a unique local domain attribute. Alternatively, the attribute information may indicate the current state of the instance of the graphical object. For example, a multi-domain object may have certain properties in a SIMMECHANICS domain that are never present in a SIMDRIVELINE or SIMPOWERSYSTEMS domain that serve to uniquely identify the particular instance of the graphical object as belonging to a SIMMECHANICS domain (SIMDRIVELINE, SIMMECHANICS and SIMPOWERSYSTEMS are software products from The MathWorks, Inc. of Natick, Mass. that work in a SIMULINK graphical modeling environment). If the attribute information associated with the instance of the graphical object is enough to uniquely identify the instance as belonging to a particular domain (step 147), the help facility retrieves from the object's class the callback function registered for the domain in which the current instance occurs. Finally the help system invokes the callback function, which provides the help appropriate to the current instance's class and domain.

In the event that the attribute information associated with instance of the graphical object is not enough to uniquely identify the instance as belonging to a particular domain (step 147), the help facility checks further for connection information associated with the instance of the graphical object that indicates how the instance is connected to other components in the graphical model 20 (step 148). The connection information may include the number and types of connection for the instance of the graphical object and may also include the types of components in the model to which the instance of the graphical object is connected. The connection information is cross-referenced with the domain information to attempt to uniquely identify the instance of the graphical object. In one implementation, attributes of graphical model components that are directly connected to the instance of the graphical object are also examined for information. In another implementation, attributes of graphical model components that are indirectly connected to the instance of the graphical object may be examined for identifying information. If the domain of the instance of the graphical object is uniquely identified, domain dependent help is provided to the user (step 152). If the domain can not be uniquely identified, a default level of help is provided to the user (step 154).

In another implementation, the help facility 30 has access to a list of registered callback methods for the domains in which a multi-domain object can occur. The registration process for a domain application (such as a plug-in domain application), which may occur at system startup, registers a help callback method for each domain application with the graphical modeling environment 4. The graphical modeling environment 4 stores the list of registered help callback methods 31 for a class of multi-domain objects as a property of the class of objects. This mechanism allows help systems to be extended to account for plug-in domain applications. When a help request associated with a multi-domain graphical object instance is later received, the help facility 30 invokes the domain-specific object callback method from the object.

Figure 5:
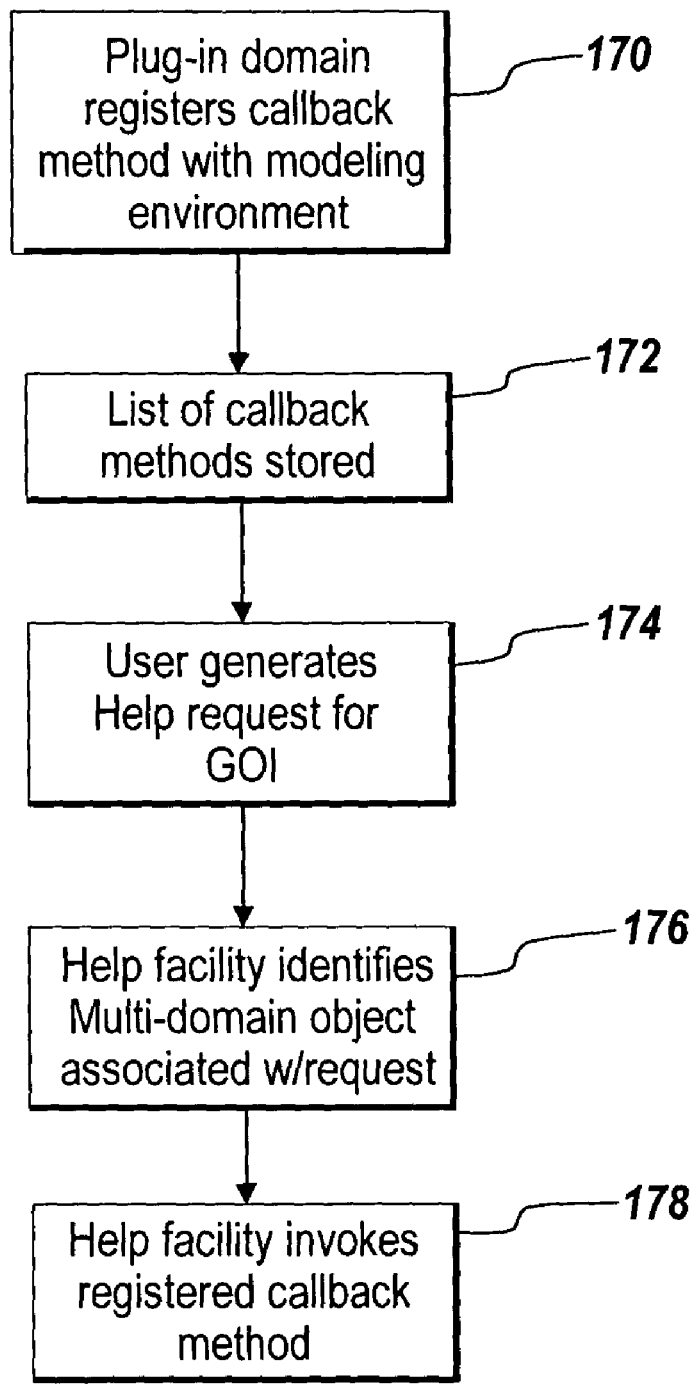
FIG. 5 is a flowchart of a sequence of steps followed by the illustrative embodiment of the present invention to provide domain-sensitive help based on a registered callback method.

The use of the registered list of callback methods can be seen in the flowchart of FIG. 5. The sequence of steps begins with a plug-in domain registering a callback method for an object with the graphical modeling environment (step 170). The graphical modeling environment stores a list of registered callback methods (step 172). Subsequently, the user generates a help request associated with a graphical object instance (step 174). The help facility identifies a multi-domain object as being associated with the request (step 176). The help facility then consults the list of registered callback methods and invokes a registered callback method for the graphical object instance (step 178).

Figure 6:
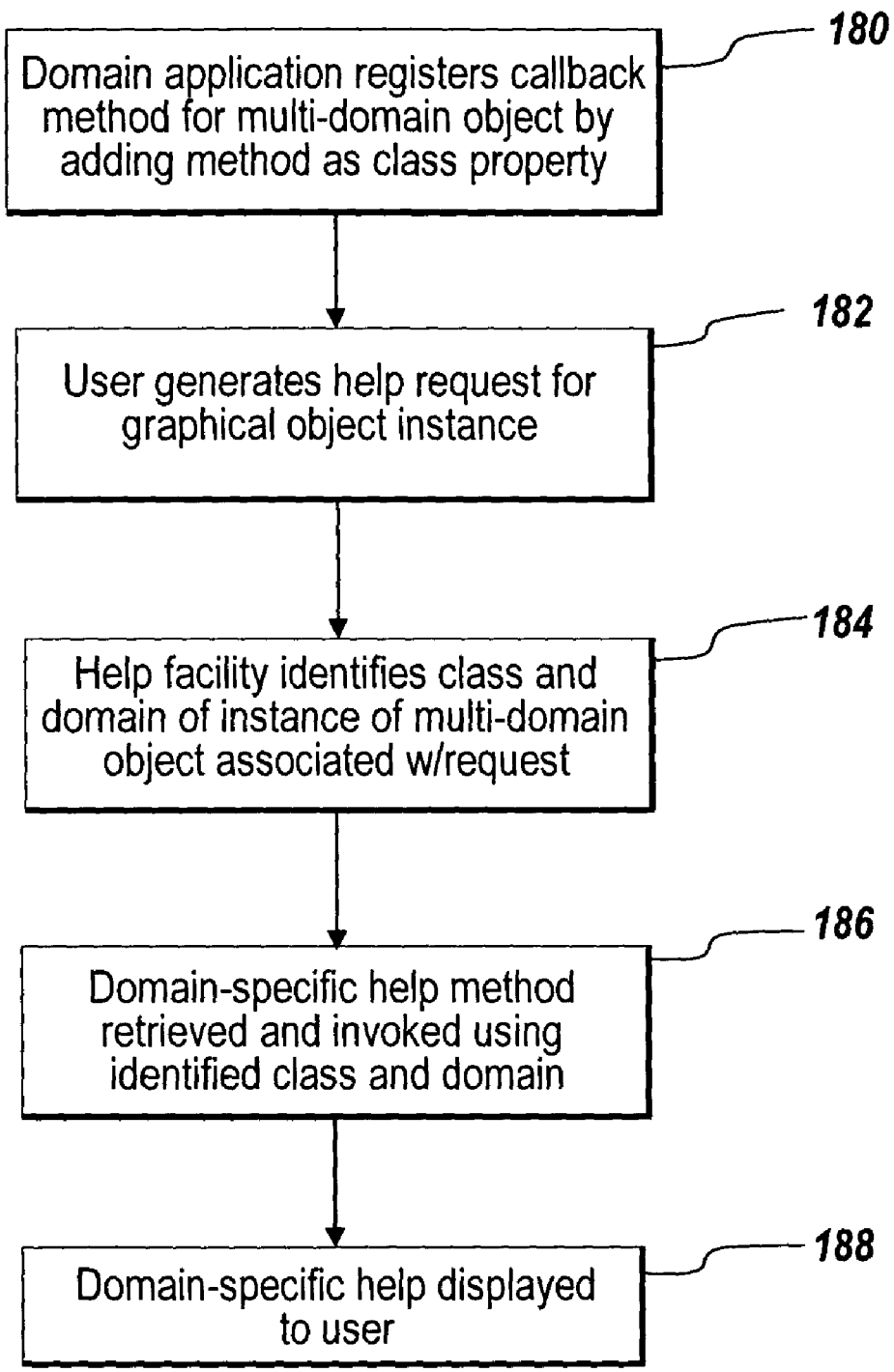
FIG. 6 is a flowchart of a sequence of steps followed by the illustrative embodiment of the present invention to provide domain-sensitive help using a domain-specific help method of a class of multi-domain objects.

The use of domain-specific help callback methods which are added as a class property for a multi-domain object (discussed above) is illustrated in FIG. 6. The sequence of steps begins with a domain application registering a help callback method for a multi-domain object by adding a help method as a class property (step 180). Subsequently, a user generates a request for help that is associated with an instance of a graphical object in the application domain (step 182). The help facility identifies the class and domain of a multi-domain object associated with the request (step 184). The domain-specific help method is then retrieved and invoked using the identified class and domain (step 186). Domain specific help is then displayed to the user (step 188).

Figure 7A:
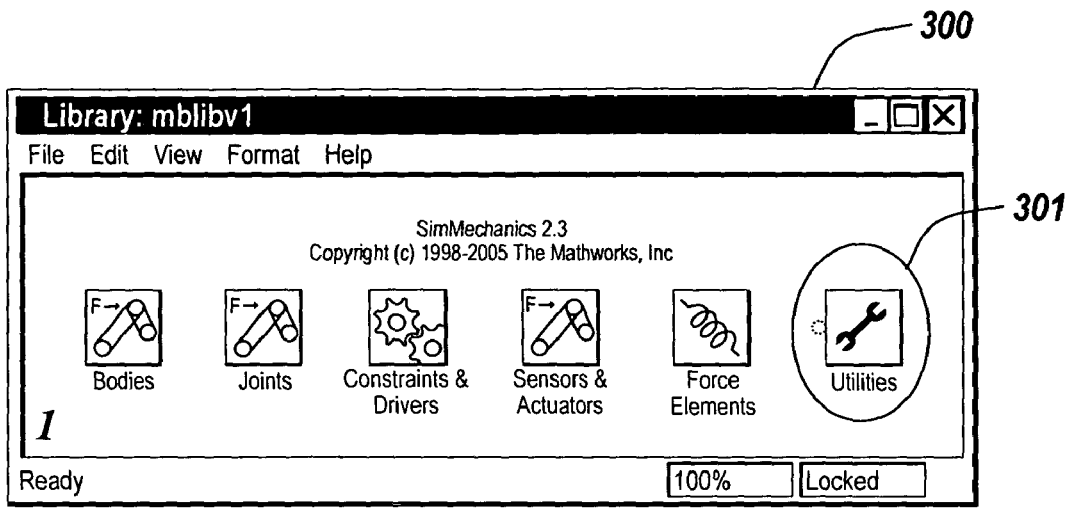
FIG. 7A is a depiction of a SimMechanics block library (top level)
Figure 7B:
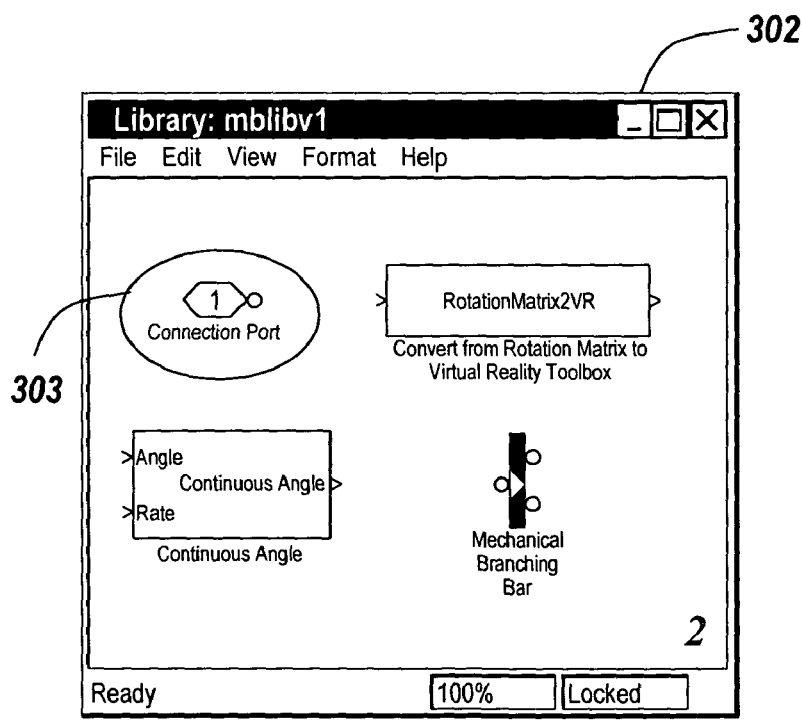
FIG. 7B is a depiction of a SimMechanics Utilities library (top level)
Figure 7C:
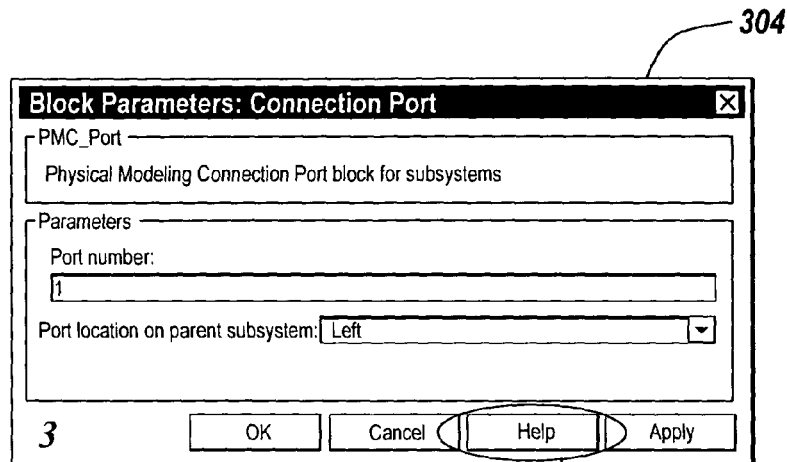
FIG. 7C is a depiction of a Connection Port block dialog, including Help button.
Figure 7D:
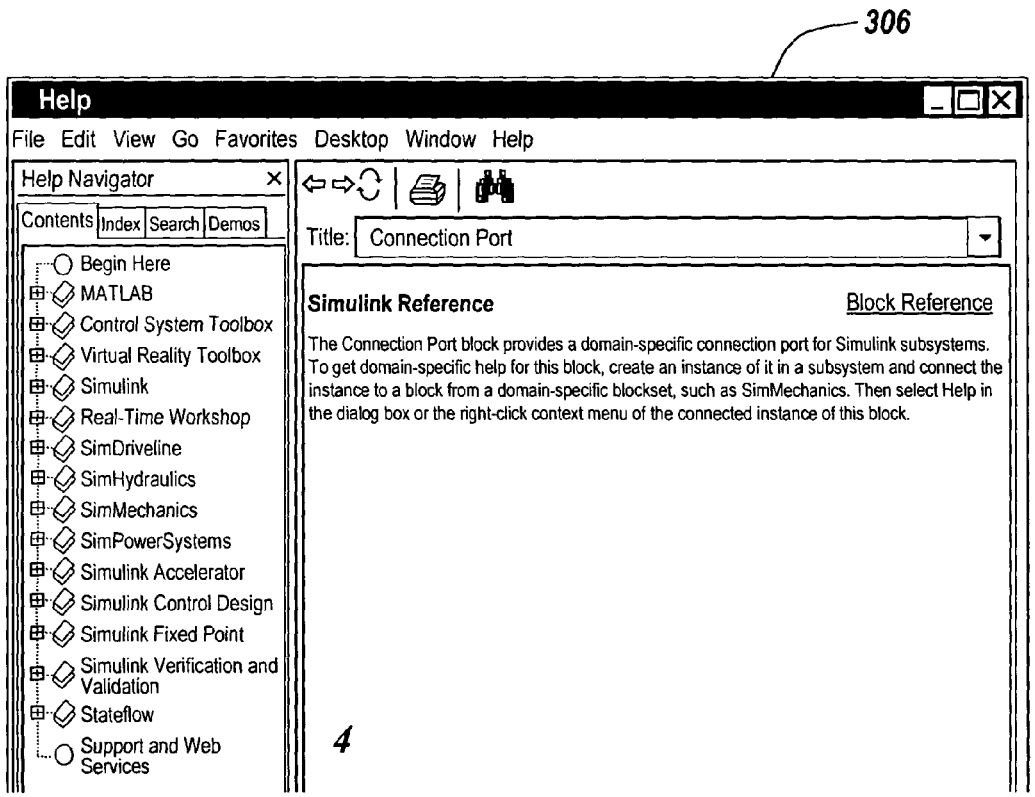
FIG. 7D is a depiction of a Generic (domain-independent) help page that appears when you click on Help in an unconnected Connection Port block.
Figure 7E:
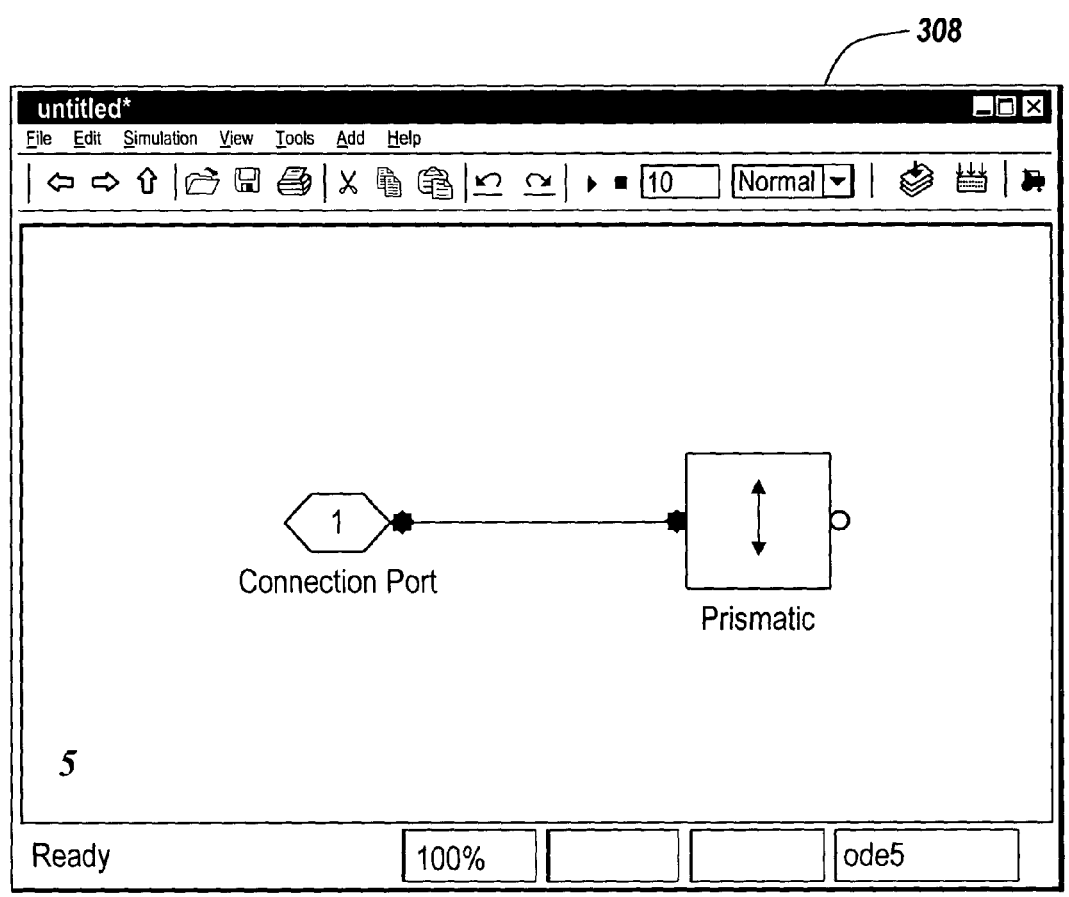
FIG. 7E is a depiction of an Instance of Connection Port in a SimMechanics model, connected so that its domain is SimMechanics.
Figure 7F:
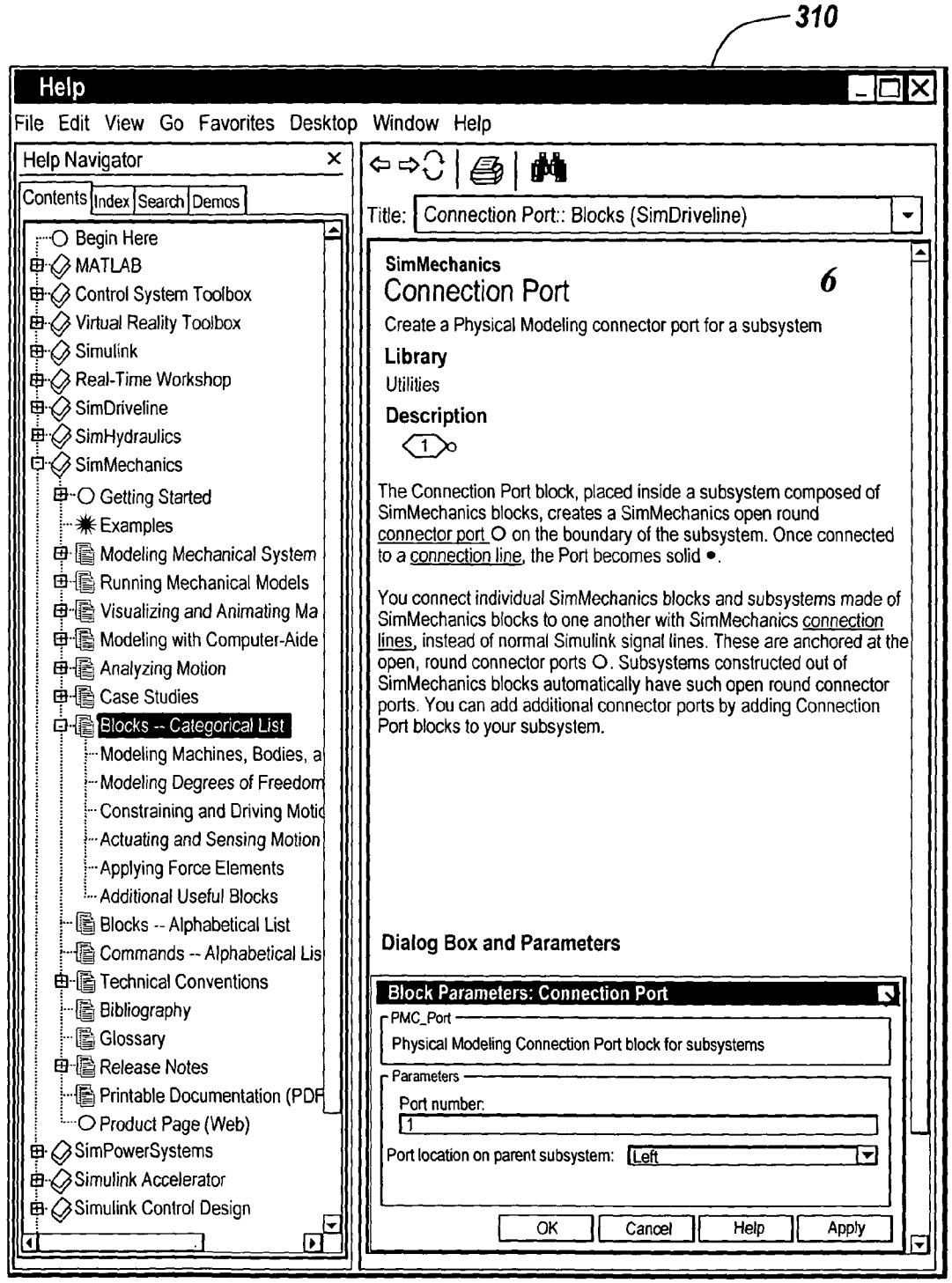
FIG. 7F is a depiction of a SimMechanics help page that appears when you click on Help in a Connection Port block connected into a SimMechanics model.

FIGS. 7A through 7I depict the user interface associated with the use of help facility 30 of the present invention. FIG. 7A depicts a screenshot 300 of a SimMechanics block library (top level) that includes a utilities library icon 301. FIG. 7B depicts the SimMechanics Utilities library (top level) 300 which includes a connection port 303. As will be discussed further below, the connection port is a multi-domain graphical object type. FIG. 7C is a depiction of a Connection Port block parameter dialog box 304 that includes a Help button 305. FIG. 7D is a depiction of a generic (domain-independent) help page that appears when you click on a Help GUI 305 or otherwise request help for an unconnected Connection Port block. FIG. 7E depicts an instance of the connection port in a SimMechanics model that is connected so that its domain is SimMechanics. When the user requests help for the connection port 303 in the SimMechanics domain, and the help facility identifies the domain either through analyzing the requesting graphical object associated with the request as discussed above or as a result of a previous registration of the object instance by the domain, the help facility provides domain-dependent help to the user. FIG. 7F is a screenshot 310 of a SimMechanics help page that appears when a user click on a Help GUI associated with a Connection Port block connected into a SimMechanics model.

Figure 7G:
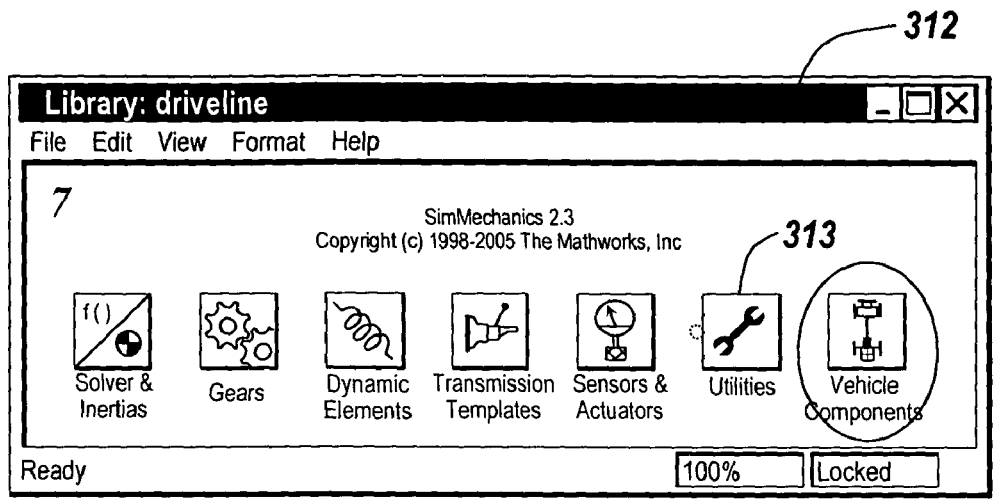
FIG. 7G is a depiction of a SimDriveline block library (top level)
Figure 7H:
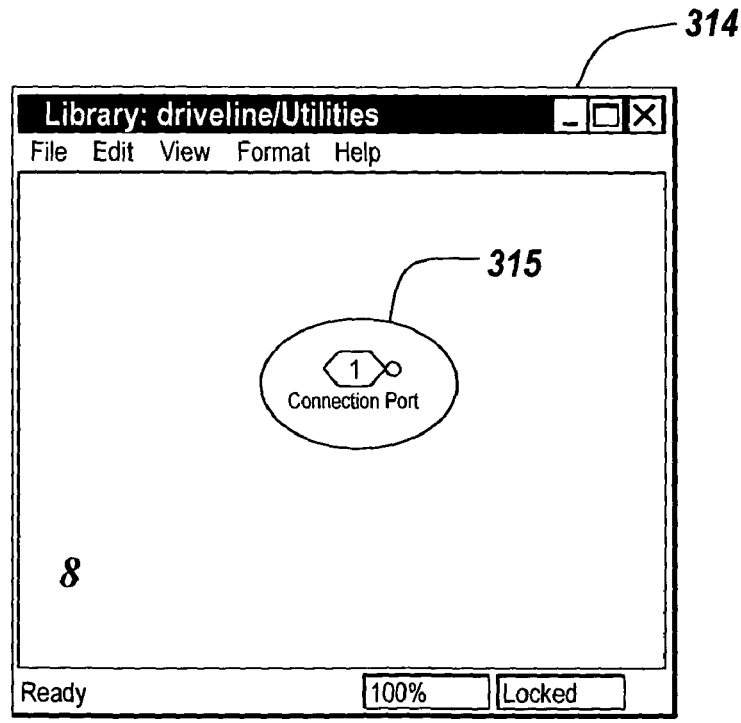
FIG. 7H is a depiction of an instance of an unconnected Connection Port from the SimDriveline library.
Figure 7I:
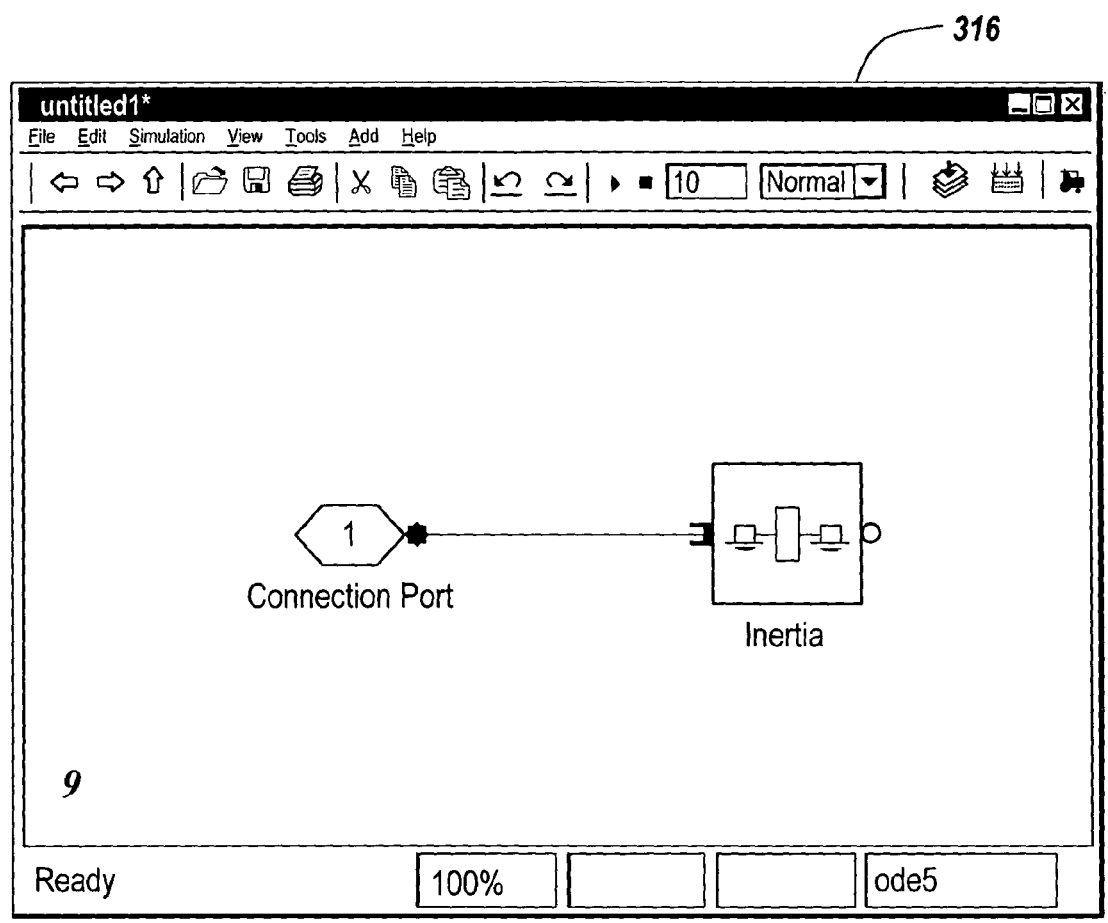
FIG. 7I is a depiction of a Instance of Connection Port in a SimDriveline model, connected so that its domain is SimDriveline.
Figure 7J:
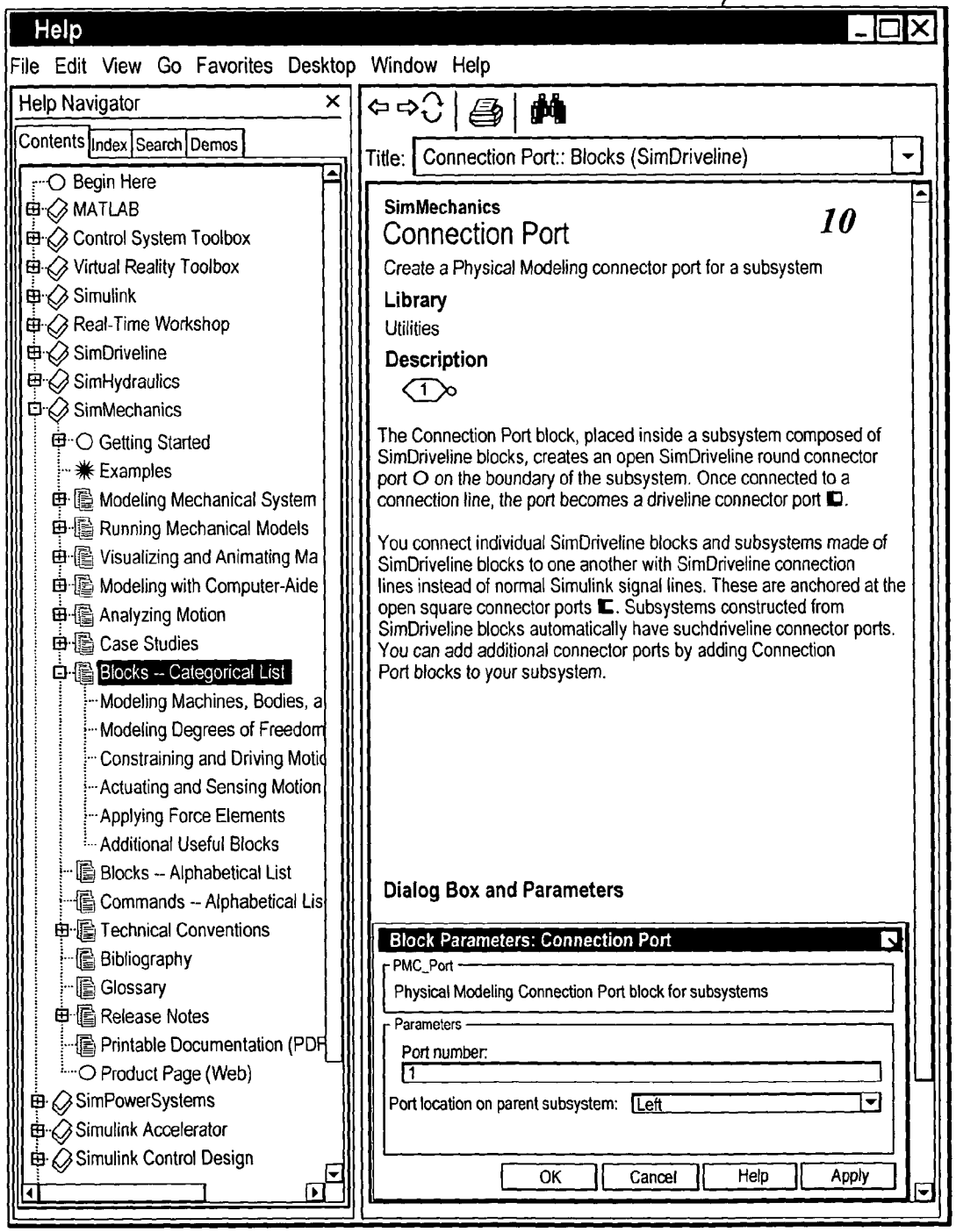
FIG. 7J is a depiction of a SimDriveline help page that appears when you click on Help in a Connection Port block connected into a SimDriveline model.

The connection port block is a type of multi-domain graphical object and appears in multiple domains. FIG. 7G is a screenshot of a SimDriveline block library (top level) 312 that includes a utilities library 313. FIG. 7H is a screenshot 314 of the utilities library that includes an icon for an instance of an unconnected Connection Port 315 from the SimDriveline library. FIG. 7I is a screenshot 316 of the instance of the Connection Port 315 in a SimDriveline model that is connected so that its domain is SimDriveline. A user clicking on a help icon associated with the connection port 315 causes the help page 320 depicted in FIG. 7J to appear. The help page is domain-dependent and differs from the help page provided in response to the help request associated with the SimMechanics connection port.

For purposes of additional illustration of the present invention, an exemplary implementation will be discussed herein with SIMULINK as the graphical modeling environment 4. It should be appreciated by those skilled in the art that other implementations utilizing other graphical modeling environments are also possible within the scope of the present invention.

SIMULINK is a graphical block diagram modeling software system based on MATLAB (also from The MathWorks, Inc. of Natick, Mass.). Domains are represented by grouped libraries of graphical blocks (objects). SIMULINK also has its own universal set of blocks, the SIMULINK block library. In a particular model, blocks are connected to one another by graphical lines. Lines and blocks have universal and model-specific properties. A domain in SIMULINK is defined by graphical block and line types and their connection syntax. A domain can be, but need not be restricted to, the functionality provided by a single SIMULINK-based product designed to work in conjunction with the SIMULINK environment.

One set of SIMULINK-based products, called PHYSICAL MODELING, contains a set of block libraries which may each be considered as separate domains. Example domains include SIMDRIVELINE, SIMMECHANICS and SIMPOWERSYSTEMS. Each block library contains a dummy block called Connection Port pointing to the prototype Connection Port block in the SIMULINK library. The dummy block is displayed only in each Physical Modeling product block library. Although it is contained in the universal SIMULINK block library, that library does not display it. The Connection Port graphical object may be considered to be a multi-domain graphical object because it can be used in more than one application domain.

Because the Connection Port graphical object is a multi-domain graphical object, a user triggering a help request referencing the Connection Port does not directly lead to Connection Port block help being displayed by the help facility 30. Instead, of displaying high level generic help data that is applicable to all domains but is therefore not particularly specific to any one domain, the help facility 30 first determines the domain by checking the other blocks to which the Connection Port block/graphical object is connected. The domain is required to occur in a finite list of possibilities. This list can be fixed before runtime, provided by the user, or determined dynamically. Ideally, the help facility is able to determine the specific domain and then triggers a help callback that provides domain-specific help for the Connection Port instance. If the help facility 30 is unable to determine the exact domain in the available list, domain-independent help is provided to a user as a fallback option.

It will be appreciated by those skilled in the art that while the examples discussed above have made use of a callback mechanism, other techniques of dynamically providing domain-specific help for multi-domain objects that do not rely on a registered callback mechanism may also be utilized within the scope of the present invention.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, FORTRAN, C, C++, C#, or JAVA. The software programs may be stored on or in one or more mediums as object code. Hardware acceleration may be used and all or a portion of the code may run on a FPGA or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a multi-domain graphical modeling environment, a method of 1 invoking domain-specific help callback methods for multi-domain graphical objects, comprising: registering:
   domain-specific help callback methods for each class of multi-domain graphical objects that occur in a domain of a multi-domain graphical model; the multi-domain graphical model including at least one instance of a multi-domain graphical object, the multi-domain graphical object occurring in more than one domain and having at least one of a different functionality, semantics or property in each domain, the registering occurring by:
   adding a domain-specific help method for a class of objects to a list of methods stored as a help callback property of the class,
   or,
   creating a domain-specific help callback method for a multi-domain graphical object, the registering occurring:
   when the object is created, or
   when the object is moved from one domain to another domain,
   the registering associated with a help facility;
   receiving a help request from a user for an instance of the multi-domain graphical object;
identifying:
   in response to the received help request,
   the class of the instance of the multi-domain graphical object associated with the help request,
   and
   in response to the received help request, the type of the multi-domain graphical object associated with the help request;
identifying dynamically:
   a class for the instance of the multi-domain graphical object,
   and
   a current domain of the instance of the multi-domain graphical object;
   and
   invoking a domain-specific callback method registered with the help facility for the type and domain identified for the multi-domain graphical object, the invoking using the identified class for the instance of the multi-domain graphical object and the identified current domain of the instance of the multi-domain graphical object.

2. The method of claim 1 wherein the identifying of the instance of the multi-domain graphical object further comprises:
   examining an attribute associated with the instance of the multi-domain graphical object.

3. The method of claim 1 wherein the identifying of the current domain further comprises:
   examining model connection information associated with the instance of the multi-domain graphical object.

4. The method of claim 1 wherein the identifying of the current domain further comprises:
   identifying the current state of the instance of the multi-domain graphical object.

5. The method of claim 1 wherein the multi-domain graphical modeling environment includes one of a block diagram modeling environment, a statechart modeling environment, a control flow diagramming environment, an entity flow network diagramming environment, a mixed-block diagram environment, a statechart design and simulation environment, a data flow diagram environment, a UML modeling environment or a physical modeling environment.

6. The method of claim 1 wherein the multi-domain graphical modeling environment includes a plurality of component libraries, each library of components associated with one of a separate domain or a specified combination of modeling domains.

7. The method of claim 2 wherein the attribute is a local domain attribute.

8. The method of claim 7 wherein the attribute controls an appearance of the instance of the multi-domain graphical object in a displayed graphical model.

9. The method of claim 3, further comprising:
   examining at least one attribute of a model component directly connected to the instance of the multi-domain graphical object.

10. The method of claim 3, further comprising:
    examining at least one attribute of a model component indirectly connected to the instance of the multi-domain graphical object.

11. The method of claim 6 wherein a multi-domain graphical object definition referenced by the instance of the multi-domain graphical object appears in more than one of the plurality of component libraries.

12. In a multi-domain graphical modeling environment, a method of invoking domain-specific help callback methods for multi-domain graphical objects, comprising:
  registering a domain-specific help callback method for a multi-domain graphical object, the multi-domain graphical object occurring in more than one domain and having at least one of a different functionality, semantics or property in each domain, the registering occurring when:
  the multi-domain graphical object is created,
  or
  the multi-domain graphical object is moved from one domain to another domain,
  the registering producing a registration;
  receiving with the multi-domain graphical modeling environment the registration from a domain application for the callback method associated with the multi-domain graphical object;
  receiving a help request from a user, the help request associated with an instance of the multi-domain graphical object, the instance of the multi-domain graphical object being part of the same modeling domain as the domain application;
  identifying a current domain of the instance of the multi-domain graphical object based on the registration of the callback method;
  invoking the registered callback method;
  executing the registered callback method when the registered callback method is invoked; and
  displaying domain-dependent help to the user as a result of the execution of the registered callback method.

13. The method of claim 12 wherein the multi-domain graphical modeling environment includes one of a block diagram modeling environment, a statechart modeling environment, a control flow diagramming environment, an entity flow network diagramming environment, a mixed-block diagram environment, a statechart design and simulation environment, a data flow diagram environment, a UML modeling environment or a physical modeling environment.

14. The method of claim 12 wherein the multi-domain graphical modeling environment includes a plurality of component libraries, each library of components associated with one of a separate domain or a specified combination of modeling domains.

15. The method of claim 12, further comprising:
  storing a pointer to the registered help callback method as a value of a property for the instance of the multi-domain object at the time of the object's creation or when it is moved from one domain to another; and
  retrieving and using the pointer to perform the invoking of the registered callback method.

16. In a multi-domain graphical modeling environment, a method of
  1 invoking domain-specific help callback methods for multi-domain graphical objects, comprising:
    loading a domain application into memory;
    registering a domain-specific callback method for a multi-domain graphical object by adding a domain-specific help method for a class of the multi-domain graphical object to a list of methods stored as a help callback property of the class, the multi-domain graphical object occurring in more than one domain and having at least one of a different functionality, semantics or property in each domain, the registering occurring when the domain application is initially loaded into the memory;
    receiving a user help request associated with an instance of the multi-domain graphical object, the instance of the multi-domain graphical object being part of the same modeling domain as the domain application;
    identifying the class and domain of the multi-domain graphical object;
    retrieving the domain-specific help method using the identified class and domain;
    invoking the domain-specific help method; and
    displaying domain-specific help to the user as a result of the execution of the registered callback method.

17. The method of claim 16 wherein the multi-domain graphical modeling environment includes one of a block diagram modeling environment, a statechart modeling environment, a control flow diagramming environment, an entity flow network diagramming environment, a mixed-block diagram environment, a statechart design and simulation environment, a data flow diagram environment, a UML modeling environment.

18. The method of claim 16 wherein the multi-domain graphical modeling environment includes a plurality of component libraries, each library of components associated with one of a separate domain or a specified combination of modeling domains.

19. The method of claim 18 wherein a multi-domain graphical object definition referenced by the instance of the multi-domain graphical object appears in more than one of the plurality of component libraries.

20. A medium holding computer-executable instructions that when executed on a processor invoke domain-specific help callback methods for multi-domain graphical objects in a multi-domain graphical modeling environment, the instructions when executed causing at least one computing device to:
  register a domain-specific callback method for a multi-domain graphical object by adding a domain-specific help method for a class of the multi-domain graphical object to a list of methods stored as a help callback property of the class, the multi-domain graphical object occurring in more than one domain and having at least one of a different functionality, semantics or property in each domain;
  interact with a graphical model that includes at least one instance of the multi-domain graphical object;
  receive a help request from a user for an instance of the multi-domain graphical object, the multi-domain graphical object:
  being of a type,
  and
  being associated with a current domain;
  identify dynamically the type of the multi-domain graphical object associated with the help request;
  identify dynamically the current domain of the instance of the multi-domain graphical object;
  retrieve a help callback method specific to the type and current domain of the instance of the multi-domain graphical object;
  invoke the callback method to display help data associated with the instance of the multi-domain graphical object; and
  display the help data associated with the instance of the multi-domain graphical object to the user.

21. The medium of claim 20 wherein the instructions for identifying the instance of the multi-domain graphical object when executed further cause the at least one computing device to:
examine an attribute associated with the instance of the multi-domain graphical object.

22. The medium of claim 20 wherein the instructions for identifying the current domain when executed further cause the at least one computing device to:
examine model connection information associated with the instance of the multi-domain graphical object.

23. The medium of claim 20 wherein the instructions for identifying the current domain when executed further cause the at least one computing device to identify the current state of the instance of the multi-domain graphical object.

24. The medium of claim 20 wherein the multi-domain graphical modeling environment is a block diagram modeling environment.

25. The medium of claim 20 wherein a multi-domain graphical modeling environment includes a plurality of component libraries and each library of components associated with one of a separate domain or a specified combination of modeling domains.

26. The medium of claim 22, wherein the instructions when executed further cause the at least one computing device to
examine at least one attribute of a model component directly connected to the instance of the multi-domain graphical object.

27. The medium of claim 22, wherein the instructions when executed further cause the at least one computing device to
examine at least one attribute of a model component indirectly connected to the instance of the multi-domain graphical object.

28. The medium of claim 25 wherein a multi-domain graphical object definition referenced by the instance of the multi-domain graphical object appears in more than one of the plurality of component libraries.

29. In a multi-domain graphical modeling environment, a method of providing domain-specific help for multi-domain graphical objects, comprising:
registering:
domain-specific help callback methods for each class of multi-domain graphical objects that occur in a domain of a multi-domain graphical model, the multi-domain graphical model including at least one instance of a multi-domain graphical object, the multi-domain graphical object occurring in more than one domain and having at least one of a different functionality, semantics or property in each domain, the registering occurring by:
adding a domain-specific help method for a class of objects to a list of methods stored as a help callback property of the class,
or,
creating a domain-specific help callback method for a multi-domain graphical object, the registering occurring:
when the object is created, or
when the object is moved from one domain to another domain, the registering associated with a help facility;
receiving a help request from a user for an instance of the multi-domain graphical object;
identifying:
in response to the received help request, the class of the instance of the multi-domain graphical object associated with the help request,
and
in response to the received help request, the type of the multi-domain graphical object associated with the help request;
identifying dynamically:
a class for the instance of the multi-domain graphical object,
and
a current domain of the instance of the multi-domain graphical object;
invoking a domain-specific callback method registered with the help facility for the type and domain identified for the multi-domain graphical object, the invoking using the identified class for the instance of the multi-domain graphical object and the identified current domain of the instance of the multi-domain graphical object; and
providing domain-specific help to the user with the help facility for the type and domain identified for the multi-domain graphical object.

30. The method of claim 29 wherein the multi-domain graphical modeling environment includes one of a block diagram modeling environment, a statechart modeling environment, a control flow diagramming environment, an entity flow network diagramming environment, a mixed-block diagram environment, a statechart design and simulation environment, a data flow diagram environment, a physical modeling environment, or a UML modeling environment.

* * * * *